April 29, 1969     D. E. STEIN     3,441,100
PNEUMATIC WEIGHT TRANSMITTER FOR SPECIAL ENVIRONMENTS
Filed June 1, 1967     Sheet 1 of 2

INVENTOR
DONALD E. STEIN

BY Seidel & Gonda

ATTORNEYS.

INVENTOR
DONALD E. STEIN
BY
ATTORNEYS.

United States Patent Office 3,441,100
Patented Apr. 29, 1969

3,441,100
PNEUMATIC WEIGHT TRANSMITTER FOR SPECIAL ENVIRONMENTS
Donald E. Stein, Millville, N.J., assignor to Kane Air Scale Company, Glassboro, N.J., a corporation of New Jersey
Continuation-in-part of application Ser. No. 561,872, June 30, 1966. This application June 1, 1967, Ser. No. 642,819
Int. Cl. G01g 5/04
U.S. Cl. 177—208
7 Claims

ABSTRACT OF THE DISCLOSURE

A pneumatic weight transmitter is provided in a special environment such as vacuum or high pressure. The transmitter is constructed in a manner so as to neutralize the effect of vacuum or pressure and uses air as the transmitting and balancing medium, thereby eliminating knife edges, levers, pivots, etc.

This application is a continuation-in-part of my co-pending application Ser. No. 561,872 filed on June 30, 1966 and entitled Pneumatic Weight Transmitter.

This invention relates to a pneumatic weight transmitter which is in the form of a measuring instrument adapted to operate in special environments such as high pressure or vacuum. The instrument output signal is a pneumatic pressure that is linear and directly proportional to the weight or force applied. The instrument is suitable for indicating, controlling, or recording weight or force.

The transmitter is designed on the force balance principle, that is, the weight being measured is null balanced in the net load chamber by air pressure acting on the effective area of a diaphragm supported plate. The use of air as the transmitting and balancing medium eliminates all knife edges, levers, and pivots. The transmitter is constructed in a manner similar to that described in my above-mentioned copending application, but modified so as to enable the transmitter to operate in a manner oblivious to its environment which could have an affect on the same such as high and low pressure environments.

A tare balance chamber with a tare load diaphragm supported plate is provided to pneumatically counterbalance any portion of the total weight, such as the weight of the container so that the net weight can be ascertained. This feature eliminates the need for an external mechanical counterbalance system to offset a tare load. The tare balance is a separate chamber with its balance plate directly connected to a center shaft so that regulated pressure in this chamber adds to the pressure in the net load chamber, thus carrying a fixed part of the weight or force applied to the transmitter without affecting the net load measurement. All moving parts are totally enclosed and protected from environment except for a neutralizing chamber which is exposed to the same pressure as the tare load diaphragm.

Friction in the transmitter is substantially eliminated by the lack of any rubbing or rolling parts. The total movement of the diaphragm system from zero load to full load does not exceed .010 inch. A built-in mechanical stop is provided to carry large weight changes until the air pressure builds up to counterbalance the weight. In this regard, the center shaft moves down .125 inch to engage the mechanical stop.

Pressure under the net load chamber is regulated automatically by a differential regulator to oppose exactly the weight or force placed on the transmitter. An increase in the weight on the platform or anvil forces the bleed nozzle to close which results in an increase in the air pressure in the net load chamber and a decrease on the platform or anvil causes the bleed nozzle to open allowing a larger bleed rate resulting in a decrease in air pressure in the net load chamber. Dampening chambers are provided to eliminate pulsation and to permit uniform measurements without clatter or excessive vibration even if the load includes mixers or other devices which would cause critical vibration.

The transmitter is provided with a novel bonded diaphragm structure on opposite sides of the dampening chambers along with the use of thin nylon reinforced diaphragms which substantially reduce any sliding forces and greatly improve the sensitivity of the transmitter so that its output is linear over the complete weighing range and will produce measurements with an error not in excess of 0.1 of 1 percent of full scale. At the same time, the transmitter is of increased sensitivity so as to permit measurements of one part in five thousand of full scale.

It is an object of the present invention to provide a novel pneumatic weight transmitter for special environments.

It is another object of the present invention to provide a pneumatic weight transmitter having an accuracy with an error not in excess of 0.1 of 1 percent of full scale while being adapted to operate in environments above and below atmospheric pressure.

It is another object of the present invention to provide a pneumatic weight transmitter which automatically compensates for pressure differentials of its environment while being simple, reliable, and adapted to be utilized in a variety of environments.

For the purpose of illustrating the invention, there is shown in the drawings a form which is presently preferred; it being understood, however, that this invention is not limited to the precise arrangements and instrumentalities shown.

Figure 1:
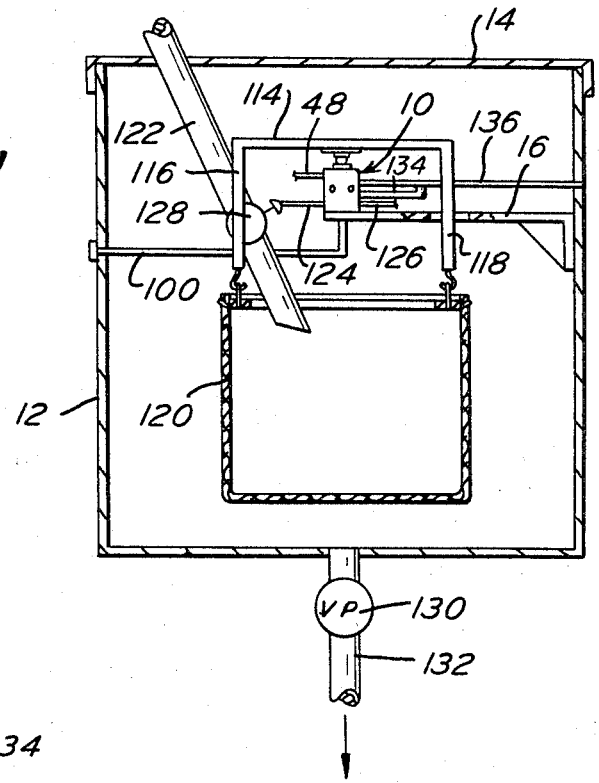
FIGURE 1 is a vertical sectional view illustrating the present invention mounted within an evacuated weighing chamber.

Referring to the drawing in detail, wherein like numerals indicate like elements, there is shown in FIGURE 1 the transmitter of the present invention in conjunction with a special environment, namely and evacuated weighing chamber. The transmitter is designated generally as 10 and is mounted within an evacuated housing 12 having a removable top wall 14. The transmitter 10 is supported within the housing 12 by a bracket 16 or any other convenient means.

Figure 3:
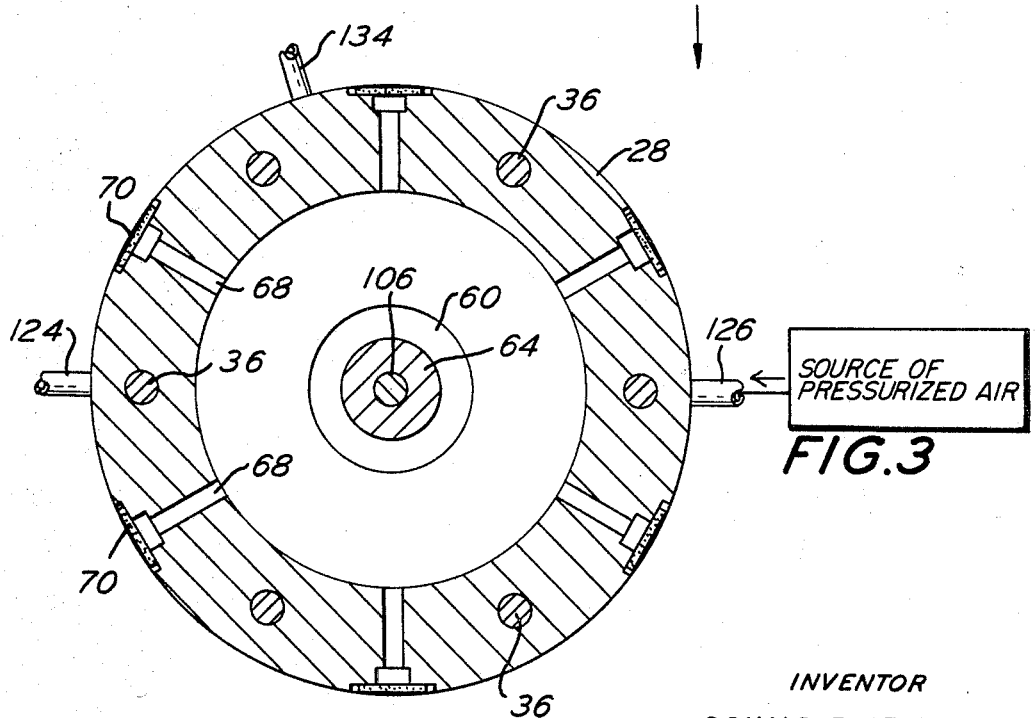
FIGURE 3 is a sectional taken along the line 3—3 in FIGURE 2.
Figure 2:
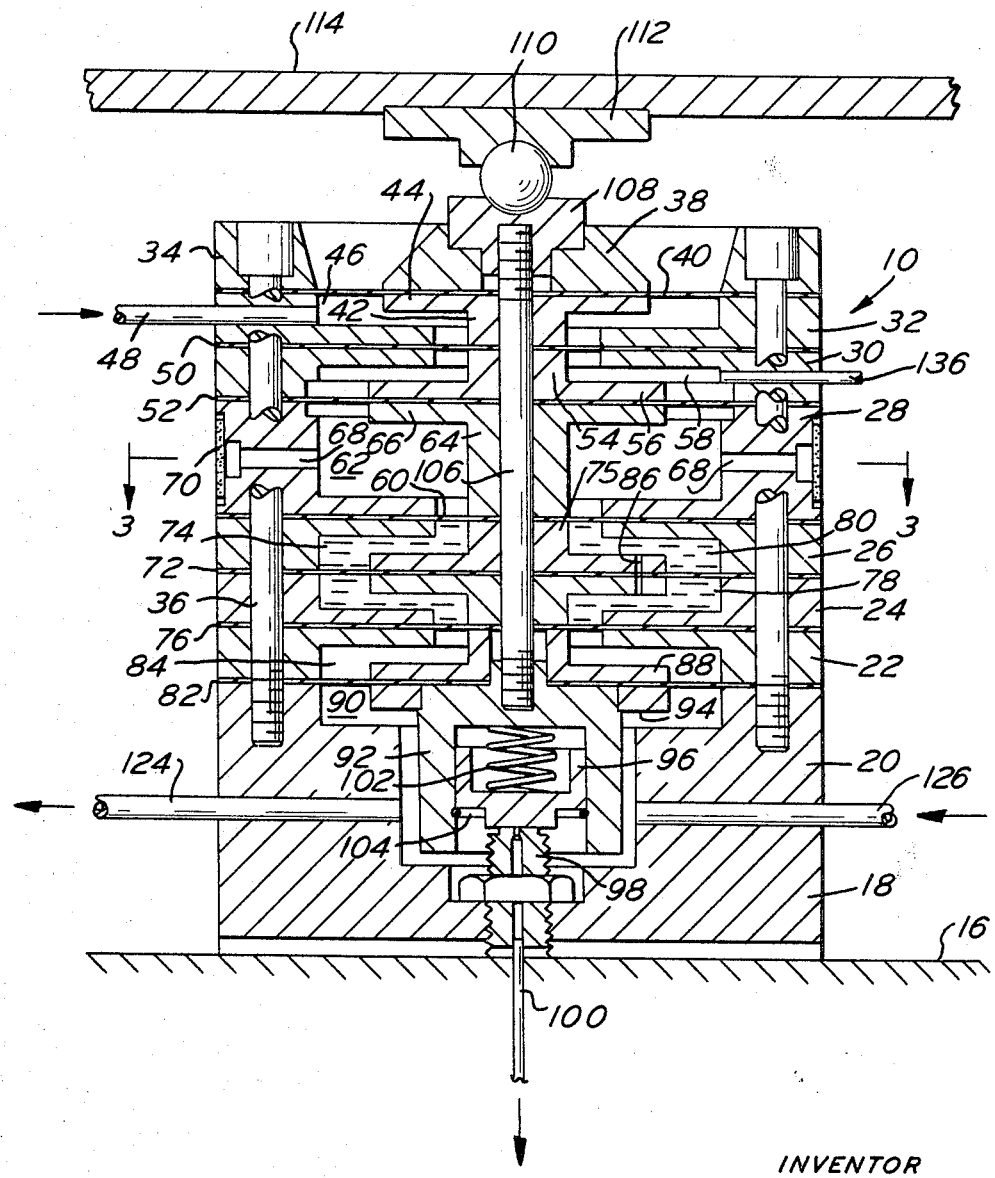
FIGURE 2 is an enlarged vertical sectional view of the transmitter of the present invention as illustrated in FIGURE 1.

The transmitter 10 includes a housing having a generally smooth continuous circular outer periphery 18. If desired, other cross-sectional configurations can be utilized. The housing is comprised of a generally cup-shaped body section 20 connected to body sections 22, 24, 26, 28, 30, 32 and 34 by a plurality of bolts 36. As is shown more clearly in FIGURE 3, six such bolts 36 are utilized. A greater or lesser number of bolts may be used as desired.

The body sections 22, 24, 26, 30 and 32 are identical. The weighing anvil 38 is provided on the upper surface of the tare load diaphragm 40. Diaphragm 40 has its outer periphery clamped between body sections 32 and 34. A spool piece 42 having a radially outwardly directed flange 44 is provided on the undersurface of diaphragm 40 within tare weight chamber 46. Air under pressure, regulated so as to neutralize the tare weight, is introduced into chamber 46 by way of conduit 48.

A diaphragm 50 has its outer peripheral portion clamped between body sections 30 and 32 and radially inwardly directed flanges on said body sections. The lower surface on spool piece 42 overlies a central annular portion of diaphragm 50. Diaphragm 52 has its outer periphery clamped between body sections 28 and 30. A spool piece 54 having a radially outwardly directed flange 56 is disposed within the chamber 58 located between diaphragms 50 and 52. The upper surface on spool piece 54 corresponds to the lower surface on spool piece 42 and engages the undersurface of diaphragm 50.

A diaphragm 60 has its outer peripheral portion clamped between body sections 26 and 28 and radially inwardly directed flanges on said body sections. A chamber for neutralizing the effect of the environment in housing 12 on the tare weight diaphragm 40 is provided and designated as 62. A spool piece 64 is provided in chamber 62 and has a radially outwardly directed flange 66 engaging an annular central portion of the lower surface of diaphragm 52.

Chamber 62 communicates with the environment of transmitter 10 by way of a plurality of radially directed passages 68. As shown more clearly in FIGURE 3, six such passages are provided. A greater or lesser number of passages 68 may be utilized as desired. The passages 68 are each provided with a filter 70 so as to prevent foreign matter from entering into chamber 62.

Hereinafter, diaphragm 60 may be referred to as a dampening diaphragm. The diaphragm 60 is preferably made from a flexible resilient polymeric material such as Hycar reinforced with a mesh material such as nylon. Hycar is a commercially available polymer of an acrylic acid ester of the B. F. Goodrich Company. Other materials may be substituted for Hycar, if desired, so long as they have the same characteristics of a rupture strength in excess of 60 p.s.i. with a thickness of .025 inch and a durometer hardness below 35. In a preferred embodiment, the durometer hardness is 30 and the rupture strength exceeds 80 p.s.i. A central annular portion of diaphragm 60 engages the lower annular surface of spool piece 64.

A diaphragm 72 has its outer periphery clamped between body sections 24 and 26. Diaphragm 72 is preferably identical with diaphragm 60. Diaphragms 60 and 72 define a chamber 74 therebetween. A spool piece 75 is provided within chamber 74. The upper surface of spool piece 75 engages a lower central annular surface on diaphragm 60. Spool piece 75 has a radially outwardly directed flange overlying a central annular portion of diaphragm 72.

A diaphragm 76, identical with diaphragms 72 and 60, has its outer peripheral portion clamped between body sections 22 and 24 and radially inwardly directed flanges on said body sections. A chamber 78 is defined between diaphragms 72 and 76. A spool piece having a radially outwardly directed flange is provided within chamber 78. A bleed passage is provided in the flanges on the spool passages within chambers 74 and 78 so that oil 80 in said chambers may communicate between the chambers. Oil 80 may be any lightweight oil base medium such as brake fluid which is temperature stable.

A diaphragm 82 has its outer periphery clamped between body sections 22 and 24. A chamber 84 is defined between diaphragms 76 and 82. A spool piece having a radially outwardly directed flange 88 is provided within chamber 84. Diaphragm 82 is a net load diaphragm and cooperates with body section 20 to define a net load chamber 90.

A valve cage 82 has a boss force-fitted, threaded or otherwise coupled to the inner periphery of a ring 94 which contacts a lower central annular surface on net load diaphragm 82. An extension of the boss extends into the spool piece within chamber 84. A cup-shaped valve member 96 is disposed within the cage 92. Cage 92 is an inverted cup-shaped member.

Valve member 92 is adapted to cooperate with nozzle 98 supported by a bottom wall of the body section 20 and connected to a conduit 100 for venting nozzle 98 to atmosphere. Conduit 100 may extend through the hole in the bracket 16.

A spring 102 biases the valve member 96 toward nozzle 98. A snap ring or other device 104 limits the downward extent of the valve member 96. Nozzle 98 may be adjusted toward and away from the valve member 96.

A weight transmitting rod 106 has its lower end threaded to the boss and the boss extension on cage 92. Rod 106 extends through each of the spool pieces described above. The upper end of rod 106 is threadedly coupled to a weight transmitting nut 108 rotatably received within a recess on and forming a part of the upper surface of anvil 38. The upper surface of nut 108 is provided with a concave recess receiving a ball 110. Ball 110 is partially receiving in a concave recess on the lower surace of an adapter 112. Adapter 112 is fixedly secured to the lower surface of a yoke 114 having arms 116 and 118. The arms 116 and 118 removably support a container 120. For purposes of illustration, container 120 is an open mesh type container adapted to be filled with a powder material by way of conduit 122.

A conduit 126 is provided for introducing air under pressure into chamber 90. A conduit 124 is provided for transmitting the pressure in chamber 90 to a pressure control valve 128 in conduit 122.

Housing 12 is hermetically sealed. The pressure within housing 12 may be above or below atmospheric pressure. For purposes of illustration, the housing 12 is provided with a means for varying the pressure therein, namely vacuum pump 130 disposed in conduit 132. It has been found that certain types of particles, such as aerosol particles having a size of approximately 5 microns can be more accurately and densely packed in a container such as container 120 when the particles are introduced into the container 120 while the same is within an evacuated environment. It has also been found that such packing of container 120 may be more uniformly accomplished by varying the pressure so as to have a pumping effect on the particles within the container 120. Thus, the pressure may be varied between 15 inches and 20 inches of mercury to accomplish the pumping effect.

Heretofore, mechanical weight transmitters utilized in conjunction with the yoke 114 within housing 12 have resulted in containers 120 being packaged with a weight differential of plus or minus 4 ounces. When utilizing the pneumatic transmitter 10 of the present invention, containers 120 have been packed with aerosol particles with a weight differential of only plus or minus .5 ounce. The operation of the weight transmitter 10 to accomplish such weighing function was accomplished as follows:

Aerosolized particles having a particle size of approximately 5 microns are delivered by way of conduit 122 into the container 120. With container 120 being made from a permeable material, a pumping effect was obtained by varying the pressure within housing 12 by way of pump 130 between 15 and 20 inches of mercury. Air under pressure was introduced into the tare weight chamber 46 by way of conduit 48 to offset the weight of the yoke 114, arms 116, and the container 120. Pressurized air is introduced by way of conduit 126 into the net load chamber 90. The pressure in chamber 90 is communicated to the diaphragm on the control valve 128 by way of conduit 124.

As the pressure builds up in chamber 90, it will reach a balancing pressure wherein it matches the weight applied to the anvil 38. As the weight applied to the anvil 38 increases due to introduction of more particles into the container 120, the pressure in chamber 90 would likewise increase to keep pace with the same. As the weight of particles introduced into container 120 reaches the desired packaging weight, the pressure in chamber 90 will be sufficient so that, by way of conduit 124, valve 128 will be closed. Additional pressurized air into chamber 90 results in the valve member 92 being raised so as to permit excess air to escape by way of nozzle 98 and conduit 100 which is vented to the atmosphere.

Housing 12 may have an observation window so that it can be ascertained that the container 120 is filled. The closing of valve 128 may generate a signal indicative of the fact that container 120 is filled. Likewise, the venting of air to atmosphere by way of conduit 100 may be utilized to generate a signal indicative of the fact that the container 120 is filled.

The transmitter 10 has an output which is linear over the complete weighing range and will continuously reproduce the weight within container 120 with an error not in excess of 0.1 of one percent of full scale. The body sections of the transmitter housing are preferably non-corrosive and made from stainless steel or cadmium plated steel. The anvil 38 is preferably made from a lightweight non-corrosive material such as an aluminum alloy.

The surface of diaphragm 52 exposed to chamber 62 equals the sum of the surface of diaphragm 40 exposed to the atmosphere within housing 12 and the surface area on diaphragm 60 exposed to chamber 62. Hence, the pressure differential between the interior of housing 12 and the surrounding environment has no effect on the operability of the transmitter 10. The various spool pieces described above have substantially no relative movement with respect to the weight transmitting rod 106. Each diaphragm has its opposite surfaces embraced by a spool piece or an annular member so that the spool pieces and rod 106 move as a unit. If an excess load is applied, the lower end of cage 92 bottoms out by contacting the bottom wall on housing body section 20.

The diaphragms 60, 72 and 76 cooperate with the oil 80 so as to elimimate pulsations and permit uniform measurements without clatter or excess vibration. Hereinafter, these diaphragms in conjunction with the oil 80 and the chambers 74 and 78 within the body sections 24 and 26 may be referred to as a means for dampening pulsations can be located between chambers 46 and 62, if desired.

Chamber 84 is vented to atmosphere by way of conduit 134 which communicates with conduit 136. Conduit 136 vents chamber 58 to atmosphere. The size and number of passages 68 are sufficient so that the pressure in balancing chamber 62 is the same as the pressure exerted on diaphragm 40. Hereinafter, "exposed net surface" means effective area.

I claim:
1. A pneumatic weight transmitter comprising a body having a weighing anvil connected to a diaphragm partially defining a chamber therebelow, said body having a net load chamber partially defined by a net load diaphragm, a weight transmitting rod extending between and coupled to said net load diaphragm and said anvil, means between said diaphragms for dampening pulsations of said rod, said body having a neutralizing chamber between said diaphragms, said balancing chamber being partially defined by first and second diaphragms, the exposed net surface on the first diaphragm in said neutralizing chamber being equal to the sum of the exposed net surface on the second diaphragm in said neutralizing chamber and the exposed net upper surface on the diaphragm connected to the anvil, and means for assuring that the pressure in said neutralizing chamber is the same as the pressure on the upper surface of the diaphragm connected to the anvil so that the transmitter may be located in environments having a pressure different from atmospheric pressure.

2. A transmitter in accordance with claim 1 wherein said first-mentioned chamber is a tare weight chamber, means for introducing a pressurized fluid into the tare weight chamber, said body having a chamber vented to atmosphere and located between the tare weight chamber and the neutralizing chamber, said body having a chamber vented to atmosphere and located between the neutralizing chamber and the net load chamber, and said last-mentioned means including passages for providing communication between said neutralizing chamber and the environment surrounding said body.

3. A transmitter in accordance with claim 1 including means coupled to the upper end of the weight transmitting rod for connecting a weight to said anvil while the weight is disposed at a level which is below the level of the anvil.

4. A transmitter in accordance with claim 1 including a housing, means supporting said transmitter within said housing, means connected to said housing for changing the pressure in said housing so that it differs from atmospheric pressure, means in said housing coupled to said anvil for applying a force to the anvil, said neutralizing chamber and the upper surface on the diaphragm connected to the anvil being exposed to the environment within said housing.

5. A transmitter in accordance with claim 4 wherein said means for applying a force to the anvil includes a yoke having arms extending downwardly to a level below the level of the body and terminating in means for supporting a container within the housing.

6. A transmitter in accordance with claim 4 including a valve member in said net load chamber, a flow passage extending from said net load chamber to the exterior of said housing, said valve member being positioned to control flow from the net load chamber through said last-mentioned passage.

7. A transmitter in accordance with claim 6 wherein said first-mentioned chamber is a tare weight chamber, said body having a first chamber between the tare weight chamber and the neutralizing chamber which is vented to the atmosphere exteriorly of said housing, and said body having a second chamber between the neutralizing and the net load chamber which is vented to atmosphere exteriorly of said housing.

References Cited

UNITED STATES PATENTS

| | | | |
|---|---|---|---|
| 2,882,037 | 4/1959 | Close et al. | 177—209 |
| 3,147,616 | 9/1964 | Rome | 177—208 X |

RICHARD B. WILKINSON, *Primary Examiner.*

G. H. MILLER, JR., *Assistant Examiner.*

U.S. Cl. X.R.

73—141